March 31, 1964
H. T. WHITE
3,127,530
MOTOR DRIVEN PUMPS
Filed Feb. 21, 1962
FIG. 1
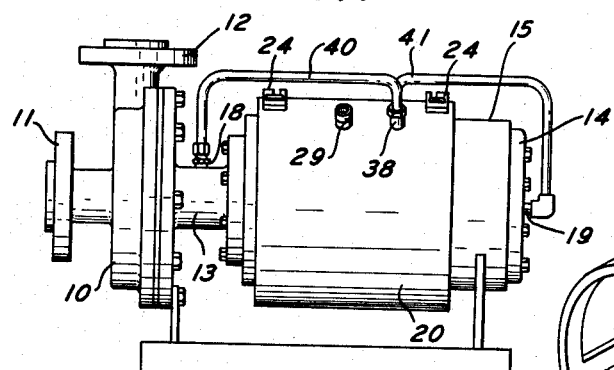
FIG. 4
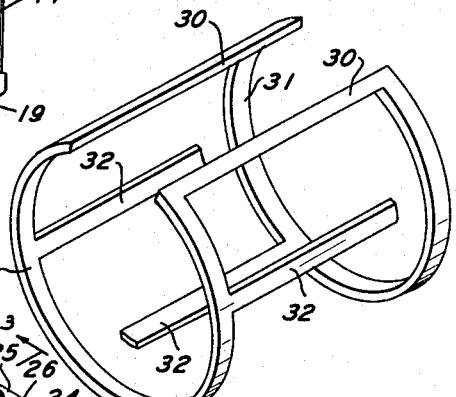
FIG. 2
FIG. 3
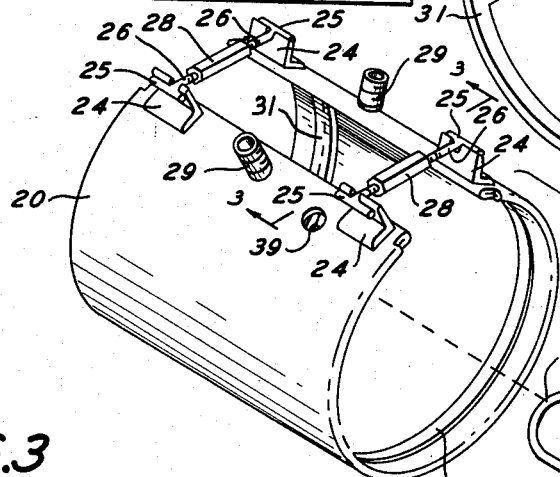
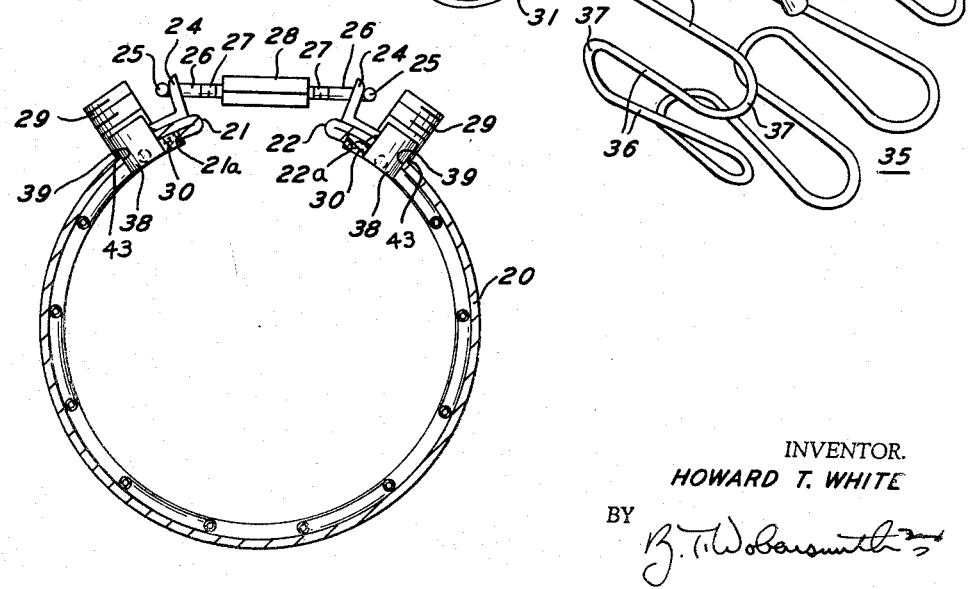
INVENTOR.
HOWARD T. WHITE
BY
ATTORNEY

United States Patent Office 3,127,530
Patented Mar. 31, 1964

3,127,530
MOTOR DRIVEN PUMPS
Howard T. White, Melrose Park, Pa., assignor to Fostoria Corporation, Huntingdon Valley, Pa., a corporation of Ohio
Filed Feb. 21, 1962, Ser. No. 174,873
9 Claims. (Cl. 310—54)

This invention relates to motor driven pumps and more particularly to cooling systems therefor.

Motor driven pumps, particularly when they are employed for handling liquids at high temperatures, require provisions for cooling fluid internally circulated within the motor rotor chamber. In some instances it is required merely that the motor stator be cooled.

In one type of cooling systems for motor driven pumps heretofore used, a water jacket has been integrally secured, as by welding, to the motor housing exteriorly of the stator windings. The welding is slow, cumbersome and costly and may result in undesired distortion of the motor housing, particularly if this portion of the housing is of light gage metal.

In my prior application for patent filed November 10, 1961, Serial No. 151,500, there is shown an end mounted heat exchanger. This is suitable for larger sizes of pumps but is not particularly adaptable for use with small pumps or for pumps previously built and which require the addition of cooling provisions.

In the event that after installation, the temperature of the fluid being pumped is elevated, with the equipment heretofore available it would be necessary to substitute another motor driven pump unit having a cooling system incorporated therein.

From the foregoing it will be seen that the equipment heretofore available had limitations and shortcomings.

It is the principal object of the present invention to provide improvements in cooling systems for motor driven pumps which will overcome the disadvantages and shortcomings of the equipment heretofore available.

It is a further object of the present invention to provide improvements in cooling systems for motor driven pumps which can be applied at the time of initial construction, if desired, or subsequently applied in the field upon changed operating requirements being imposed upon a motor driven pump.

It is a further object of the present invention to provide improvements in cooling systems for motor driven pumps which by relatively simple changes can be adapted to meet demands of various operating conditions, including water jacketing of the motor and/or additional cooling provisions.

It is a further object of the present invention to provide improvements in cooling systems for motor driven pumps in which the components are of relatively simple construction and free from likelihood of difficulties in installation or in use.

It is a further object of the present invention to provide improvements in cooling systems for motor driven pumps in which the components can be quickly and easily installed upon a particular unit as required or desired.

Other objects and advantageous features of the invention will be apparent from the description and claims.

The nature and characteristic features of the invention will be more readily understood from the following description, taken in connection with the accompanying drawings forming part thereof, in which:

FIGURE 1 is a view in elevation of a motor driven pump having a cooling system in accordance with the invention applied thereto;

FIG. 2 is an exploded perspective view of the cooling system removed from the motor driven pump;

FIG. 3 is a transverse sectional view taken approximately on the line 3—3 of FIG. 2, and with the heat exchanger in place; and FIG. 4 is a view in perspective of a modified form of gasket employed in connection with the invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to FIG. 1 of the drawings, the motor driven pump there shown has a pump housing 10 with a fluid inlet connector 11 and a fluid delivery connector 12. The pump housing 10 can be connected by a neck 13 to a motor housing 14. A motor driven pump of this general type is shown in my U.S. Patent No. 2,913,988, but with a welded exterior construction of the type referred to above. The motor housing 14 advantageously has an interior sleeve (not shown) isolating a motor stator chamber. The motor housing 14, as illustrated, has a cylindrical longitudinally extending housing section 15 surrounding the motor stator in a well known manner.

The neck 13 can be provided with an internal cooling fluid inlet connection 18 and the remote end of the motor housing 14 can be provided with a fluid delivery connection 19 for the delivery for cooling the fluid supplied through the inlet connection 18 and internally circulated.

The cooling apparatus in accordance with the invention as shown particularly in FIGS. 2 and 3 preferably includes a casing 20 of sheet metal, the end marginal edges being inturned as at 21, with inner faces 21a, and the side marginal edges being inturned as at 22, with inner faces 22a.

The casing 20 is bent and shaped into a generally cylindrical shape with the ends 21 and 22 in spaced relation to accommodate the casing 20 to the electrical connections (not shown) on the motor housing 14.

Opposed pairs of lugs 24 are welded or otherwise secured to the casing 20. Each of the lugs has the cross bar 25 of a T-shaped clamp 26 in engagement therewith, the other portions 27 of the clamps 26 being oppositely threaded and in engagement with oppositely internally threaded turnbuckles 28 for tightening.

The casing 20, spaced inwardly from the ends 23 has secured thereto threaded fluid connectors 29, one of which serves for supply to and the other which serves for the discharge of cooling fluid from the interior of the casing 20.

In order to prevent fluid leakage, a gasket is provided of open rectangular shape with end strips 30 and side strips 31. The outer edges of the end strips 30 and side strips 31 are positioned and retained by the inturned end edges 21 and side edges 22. The gasket can be of any desired material which will be adequately flexible to provide a fluid tight joint in engagement with the casing 20 and with the exterior of the motor housing section 15.

In the simplest form of the invention, in which only a water jacketing action of the cooling apparatus is required, the gasket can have in spaced parallel relation to the end strips 30, baffle strips 32 extending alternately from opposite side strips 31 and terminating in spaced relation to the other side strip 31. The baffle strips 32 provide a tortuous path for fluid flow between the fluid connectors 29.

Where, in addition to cooling the motor housing section 15, cooling of fluid circulated interiorly of the motor housing is required, an internal heat exchanger 35 is provided, formed of tubing bent between its ends as shown in FIG. 2 to provide substantially parallel cross runs 36 connected by end bends 37 and with fluid connectors 38 at each end which extend outwardly through openings 39 provided in the casing 20 contiguous to the fluid connectors 29, with welds 42 to prevent fluid leakage.

The internal heat exchanger 35 is disposed exteriorly of the motor housing section 15, interiorly of the casing 20, and between the end strips 30 and the side strips 31 and can be connected into the internal cooling fluid circuit by pipes 40 and 41.

The cross runs 36 can be disposed between the baffle strips 32 or if desired and, as shown in FIG. 2, the baffle strips 32 can be omitted with the cross bars 36 and end bends 37 of the heat exchanger providing a tortuous path for cooling fluid flow between the fluid connectors 29 interiorly of the casing 20.

The mode of use should be apparent from the foregoing. It may be noted that cooling fluid supplied to one of the fluid connectors 29 passes within the casing 20 around the major portion of the periphery bounded by the gasket side strips 31 and end strips 30 in cooling relation thereto and to the other fluid connector 29 for discharge. A tortuous path within the casing 20 may be provided by the baffle strips 32.

If additional cooling is required, the hot fluid from the internal cooling circuit of the motor, and from the pipe 41, is delivered to one of the fluid connectors 38 to and through the interior of the heat exchanger 35, passing through the cross runs 36 and end bends 37, in fast heat exchange relation to the cooling fluid within the casing 20 and is delivered to the pipe 40 for return in cooler condition to the motor housing 14.

It will be seen that the cooling apparatus herein described can be readily applied to the exterior of the motor housing 14 of a new unit, or can be readily applied to the motor housing 14 of a unit presently installed without the necessity for removing it from the fluid line and without disturbing the electrical connections.

I claim:

1. Cooling apparatus for the motor housing of a motor driven pump comprising a sheet metal casing having a wall with spaced parallel end marginal edge portions and curved space side marginal edge portions, said edge portions being of at least casing wall thickness and providing gasket retaining abutment faces, said casing being of a size to extend in partial surrounding relation to a motor housing, a hollow rectangular gasket engaging said casing at said abutment faces of said marginal edge portions and extending therealong for simultaneous engagement with the exterior of said motor housing, adjustable connecting members extending between said end marginal edge portions for retaining said casing in mounted position on the motor housing, cooling fluid inlet and delivery connections in communication with the interior of said casing, and members interiorly disposed in said casing and providing a tortuous flow path for cooling fluid flowing between said cooling fluid inlet and delivery connections.

2. Cooling apparatus as defined in claim 1 in which said last members include a heat exchanger interiorly disposed in said casing and said heat exchanger has fluid connectors extending through said casing in spaced relation to the end marginal edge portions.

3. Cooling apparatus as defined in claim 1 in which a heat exchanger is interiorly disposed in said casing and has major runs extending in the same direction as said end marginal edge portions and connecting end bends.

4. Cooling apparatus as defined in claim 1 in which the interiorly disposed members are baffle strips extending from said gasket.

5. Cooling apparatus as defined in claim 1 in which the interiorly disposed members are portions of an auxiliary heat exchanger disposed in said casing, and said auxiliary heat exchanger has fluid connectors extending through the casing.

6. Cooling apparatus as defined in claim 1 in which the interiorly disposed members include baffle members extending from said gasket and portions of an auxiliary heat exchanger disposed in said casing, and said auxiliary heat exchanger has fluid connectors extending through the casing.

7. Cooling apparatus as defined in claim 1 in which the marginal edge portions of said casing include flat inturned edges extending along the casing with interior faces in engagement with said gasket and retaining said gasket from movement outwardly along the marginal edge portions of said casing.

8. Cooling apparatus as defined in claim 1 in which the adjustable connecting members include spaced lugs on the exterior of said casing contiguous to the end marginal edge portions and threaded connectors engaged with and between said lugs.

9. Cooling apparatus for the motor housing of a motor driven pump comprising a sheet metal fluid casing having a wall in partial surrounding relation to the motor housing, said wall having spaced parallel end marginal edge portions and curved spaced side marginal edge portions in parallel planes, said edge portions being of at least casing wall thickness and providing gasket retaining abutment faces, a hollow gasket having end strips engaging said casing along said end marginal edge portions and side strips engaging said casing along said side marginal edge portions, said end and side strips being adapted for simultaneous engagement with the exterior of said motor housing, spaced lugs contiguous to the end marginal edge portions of said casing on the exterior thereof, adjustable members connecting said lugs and clamping said casing and said gasket in position on the exterior of the motor housing, cooling fluid inlet and delivery connections contiguous to said end marginal edge portions in communication with the interior of said casing, a heat exchanger in said casing having a tubular body in a tortuous path with major runs parallel to said end marginal edge portions, said heat exchanger having end fluid connections extending through said casing at locations contiguous to said end marginal edge portions.

References Cited in the file of this patent

UNITED STATES PATENTS

| | | |
|---|---|---|
| 1,631,721 | Boischevalier | June 7, 1927 |
| 2,625,804 | Patch | Jan. 20, 1953 |
| 2,862,120 | Onsrud | Nov. 25, 1958 |
| 2,913,988 | White | Nov. 24, 1959 |
| 2,985,435 | Gross | May 23, 1961 |

FOREIGN PATENTS

| | | |
|---|---|---|
| 1,110,212 | France | Oct. 5, 1955 |